E. RENAULT.
LACE MAKING MACHINE.
APPLICATION FILED JULY 23, 1918.
1,316,647.
Patented Sept. 23, 1919.
5 SHEETS—SHEET 1.
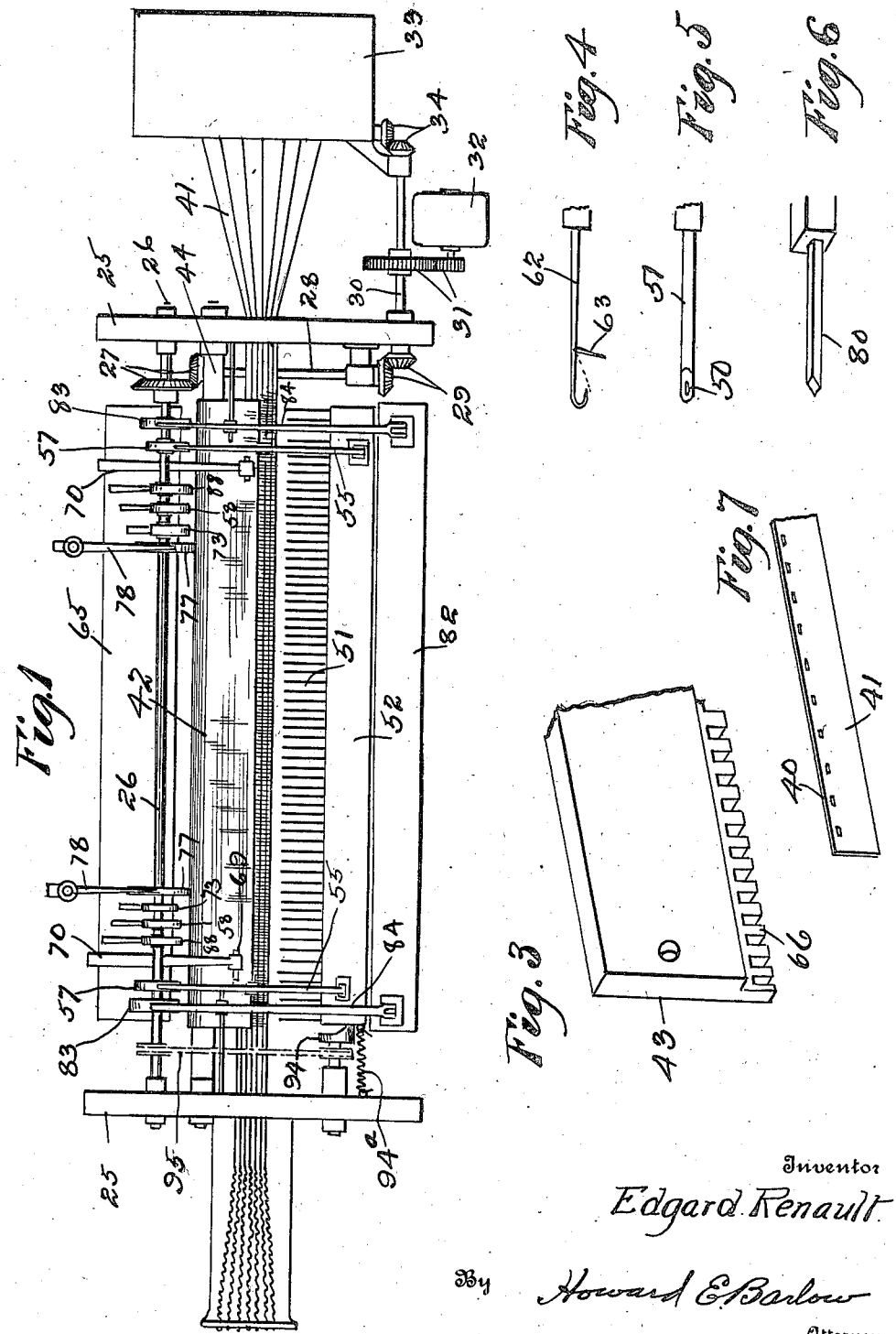
Inventor
Edgard Renault
By Howard E Barlow
Attorney

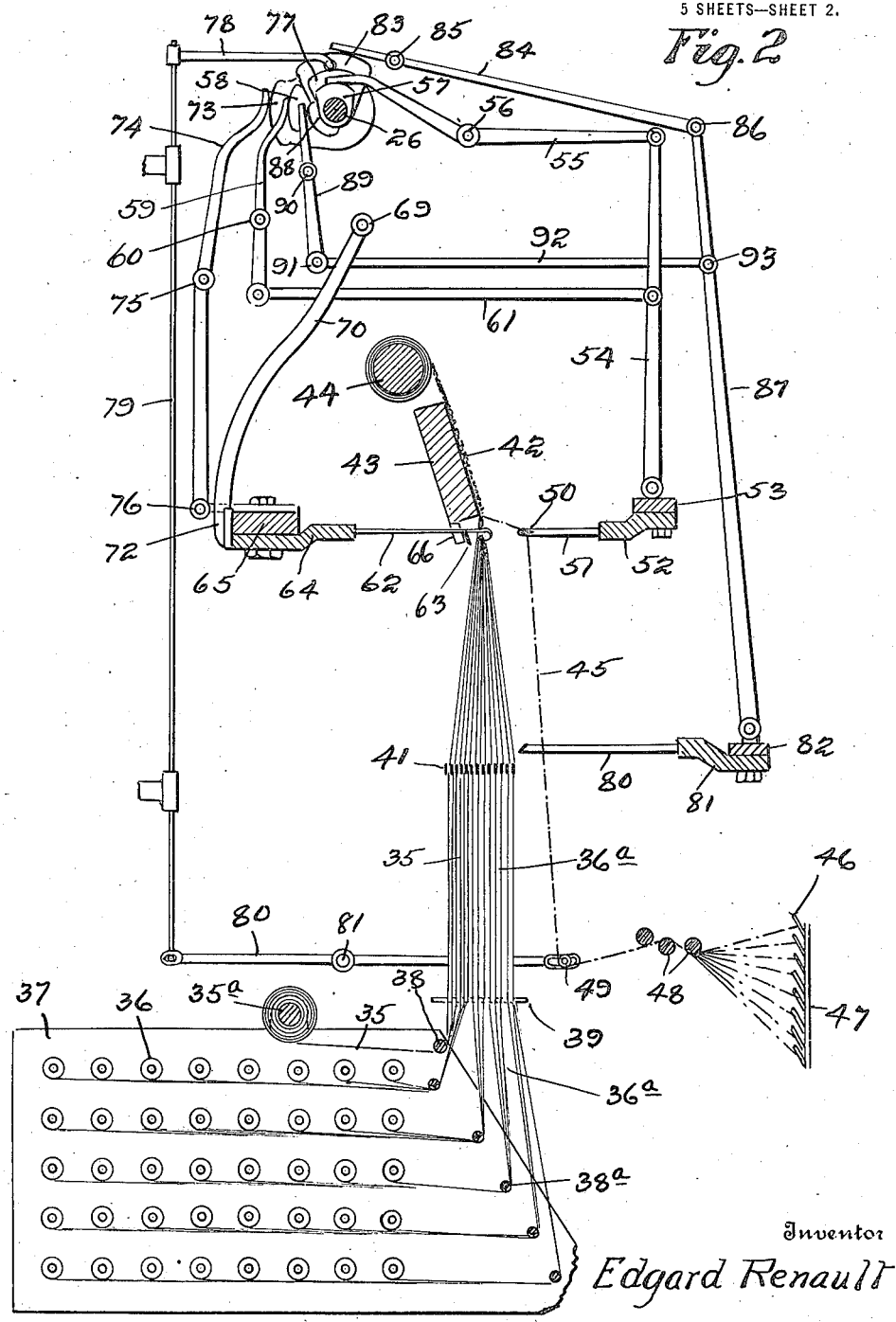

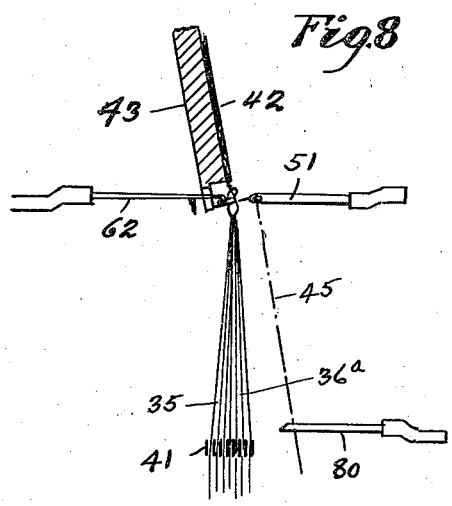
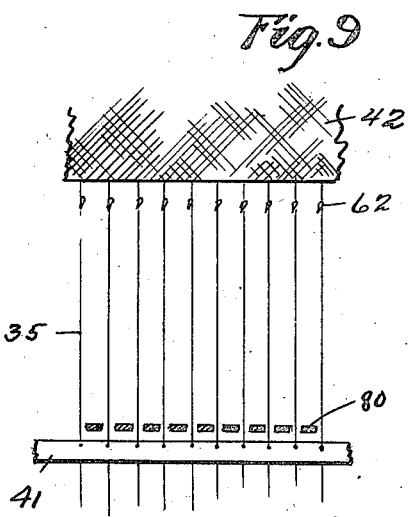
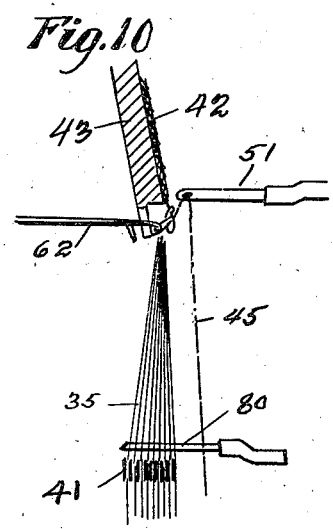
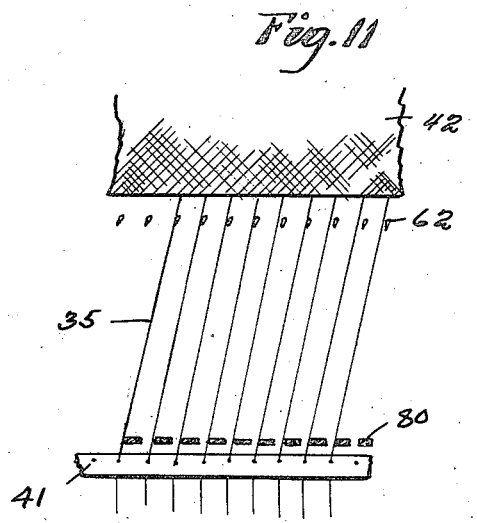

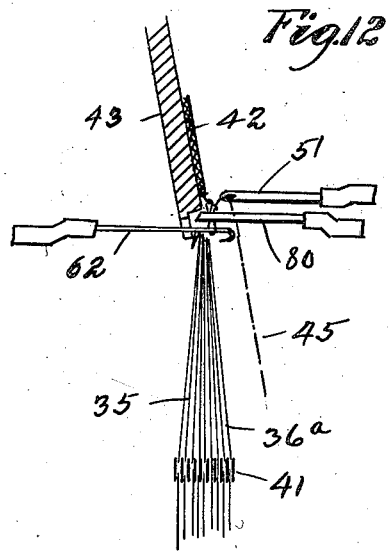
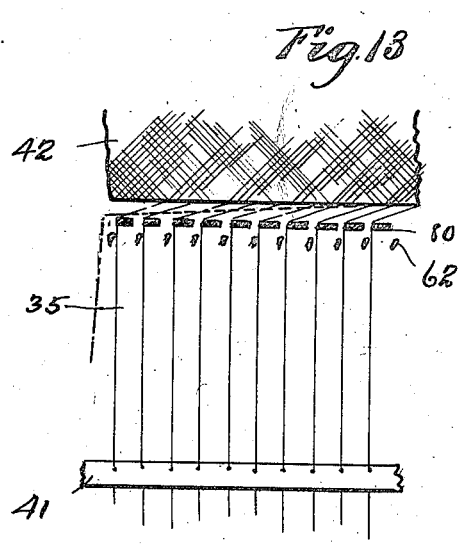
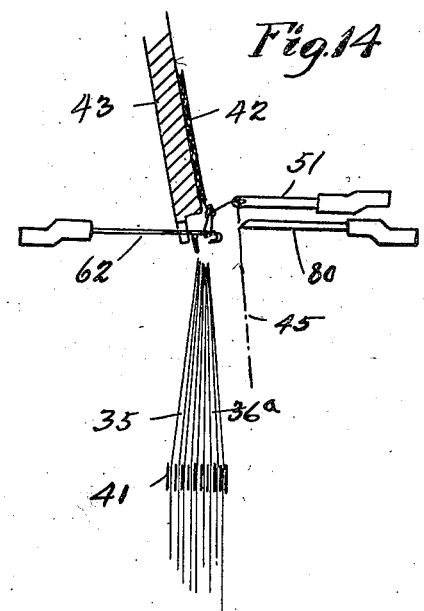
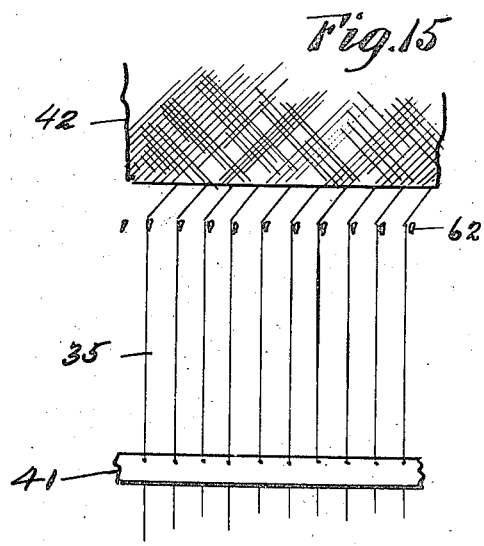

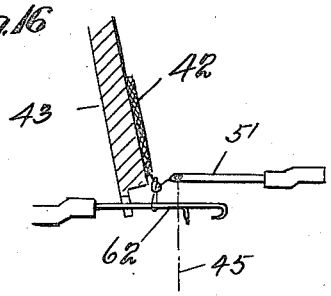
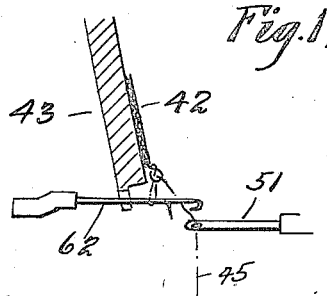
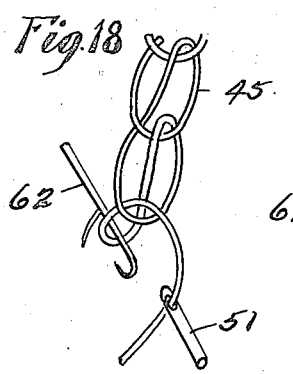
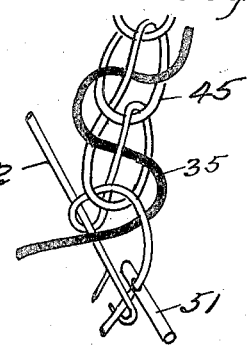
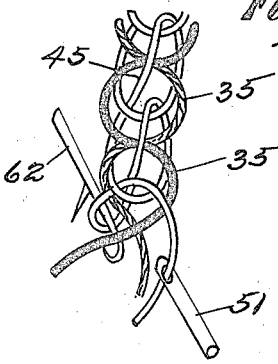
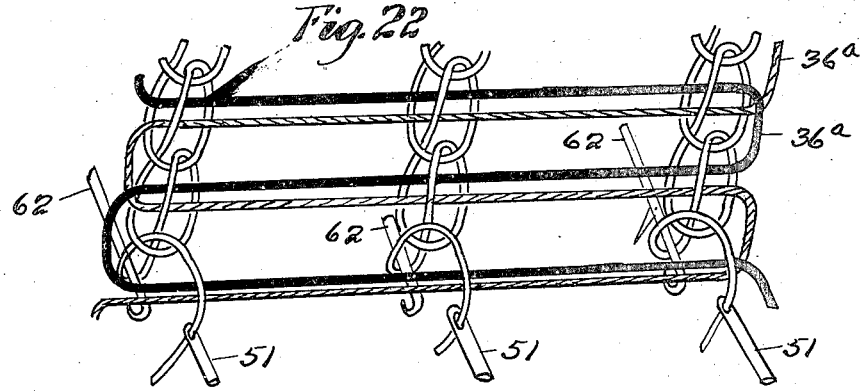
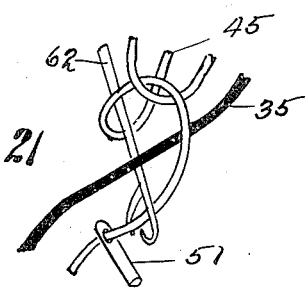

UNITED STATES PATENT OFFICE.

EDGARD RENAULT, OF PAWTUCKET, RHODE ISLAND, ASSIGNOR OF ONE-HALF TO LOUIS LESCAULT, OF PAWTUCKET, RHODE ISLAND.

LACE-MAKING MACHINE.

1,316,647.     Specification of Letters Patent.    Patented Sept. 23, 1919.

Application filed July 23, 1918. Serial No. 246,382.

*To all whom it may concern:*

Be it known that I, EDGARD RENAULT, a citizen of the United States, and resident of the city of Pawtucket, in the county of Providence and State of Rhode Island, have invented certain new and useful Improvements in Lace-Making Machines, of which the following is a specification.

This invention relates to lace-making machines.

The usual machine employed in the manufacture of lace carries a multiplicity of rotary shuttles mounted in carriages which are reciprocated in and out between the threads to assist in forming the fabric.

It is found in practice that this class of machines has many disadvantages; among others being first that it is very expensive to build and to keep in repair as the shuttles and carriers are also very expensive to make and owing to their somewhat complicated and delicate construction soon become worn and destroyed and on account of their very small size they carry but little thread and must often be replenished. Then again the sizes of yarns which may be used in this type of machine are quite limited, as the larger numbers take up so much room that it is impossible for the shuttles and carriers to pass between them without jamming or binding. All of these and other difficulties inherent in this type of machine serve to render its production quite expensive.

The object of applicant's invention is to provide a lace-making machine which will entirely eliminate the use of shuttles and carriers and instead thereof employ hooks and needles and other coöperating fingers or points all arranged to be moved at predetermined intervals by simple mechanism to position different sets of threads and weave or tie the whole together to form a fabric and so perform all of the functions of the carrier type of machine, and in addition to possess many advantages thereover; among others being first, the threads, instead of being wound on small delicate shuttles to be passed between the warp threads, are led direct from large spools or bobbins, each being operated by the hooks and the needles to form a chain of loops and to be connected to adjacent warp threads to form any desired pattern of lace fabric; second, the mechanism is very simple and inexpensive to construct and quite inexpensive to keep in practical operation; third, by my improved mechanism the work produced is a very close imitation of hand-made lace; and fourth, with my machine I can use a cheaper grade of yarn than is possible to be used on a shuttle machine, and also I may use very much larger yarns than is possible to use in that class of machines and, therefore, I am enabled to produce a much heavier class of work and work of much greater variety both of kinds and patterns.

With these and other objects in view, the invention consists of certain novel features of construction, as will be more fully described, and particularly pointed out in the appended claims.

In the accompanying drawings:

Figure 1— is a plan view of my improved machine, showing the general arrangement of mechanism and its operating relation to the jacquard.

Fig. 2— is an end view with the frame work removed and the parts arranged to best illustrate the motions of the operating mechanism.

Fig. 3— is a perspective view of the facing-bar which is toothed on its lower edge to provide for the hooks.

Fig. 4— is a detail of one of the latch hooks.

Fig. 5— is a detail of one of the needles having the eye at its point or operating end.

Fig. 6— is a perspective view of one of the warp thread operating fingers or points.

Fig. 7— is a perspective view showing a portion of one of the jacquard operated thread bars.

Fig. 8— is a detail illustrating one position of the hook, needle and finger after a loop has been formed in the chain thread.

Fig. 9— is a front view showing the general position of the hooks and the fingers when the warp threads are set vertically by the jacquard operated thread bar.

Fig. 10— shows the next action of the machine, which is that of having raised the needles and moved the fingers forward between the warp threads.

Fig. 11— is a front view showing one set of warp threads as having been moved laterally by their thread bar to be engaged by the next forward and upward movement of the fingers to be lifted above the hooks.

Fig. 12— is a side elevation showing the fingers as having been raised above the hooks.

Fig. 13— is a front elevation illustrating the position of the fingers shown in Fig. 11 in which position the threads are ready to drop and rest upon the back of the hooks when the fingers are withdrawn.

Fig. 14— is a side elevation showing the fingers as having been withdrawn.

Fig. 15— is a front view showing the threads as now hanging over the back of the hooks whereby when next carried to the right by the threaded bars and then raised by the next upward motion of the fingers they form a loop about the hook ready to be tied in by the next loop of the chain thread.

Fig. 16— shows the hooks as having been brought forward to carry the loop of chain thread as formed thereon in beyond the latch.

Fig.— 17 shows the hook as being drawn back or outward slightly, the needle as having been dropped below the hook and carried around to the opposite side thereof to pass the thread below the hook and in position to be engaged by its next rearward motion to draw the thread through the loop and form another link in the chain.

Fig. 18— is a greatly enlarged view illustrating the formation of one of the loops or links by which the chain is formed.

Fig. 19— is a view illustrating the method of weaving of a warp thread into the chain formed by the chain thread.

Fig. 20— illustrates the method of weaving two separate warp threads into the chain formed by the chain thread.

Fig. 21— shows the hook as having been moved forward to engage the chain thread after it has been passed around the warp thread to sew or loop the latter into the chain.

Fig. 22— illustrates an arrangement of three separate chains as connected together by a set of independent or guimp threads whereby the ground work or foundation of one style of fabric is formed.

With reference to the drawings, 25 in Fig. 1, designates the end frames of the machine on which the operating mechanism is mounted, and 26 the cam-shaft on which the different cams are fixed to produce the various motions of the mechanism necessary for performing the various operations all of which are hereinafter described in detail. This cam-shaft also constitutes the main driving shaft of the machine, which receives its motion through the bevel gears 27, short shaft 28, miter gears 29, jack shaft 30 and spur gear 31 from the motor 32. This jack-shaft 30 also serves to connect the jacquard 33 through the bevel gears 34 to run in time with the mechanism of the lace-making machine.

The warp threads 35 are led from the beam 35ª and a set of independent threads 36ª are led from spools 36 which latter are mounted on the supports 37 so that the different threads of both sets will pass over the guide-bars 38 and 38ª separately up through the slay 39, thence they pass through their individual eyes 40, see Fig. 7, in the different thread-bars 41 of the set, which bars are reciprocated endwise by action of the jacquard mechanism in the casing 33 the detail mechanism of which is not shown, each of which bars is arranged to move its particular set of threads sidewise relative to the fabric being formed, to which the upper end of each thread is connected. This finished fabric 42 which is in the process of construction lies against the outer surface of the facing-bar 43 over which it is guided to be wound upon the take-up roll 44 as fast as made, which roll is rotated at the proper time by suitable mechanism (not shown) to take up the fabric as fast as formed.

A second set of threads 45 herein termed the "chain threads" is led from spools or bobbins on the thread-board 47 over a set of fixed tension-bars 48 thence over the continuously moving tension-bar 49, up through the eyes 50 of their respective needles 51, to the points where they are connected to the fabric.

These needles 51 are mounted in any suitable way preferably in blocks 52 which are connected to the needle-bar 53 which extends the length of the machine and to this bar is imparted a slight up and down motion through the rod 54 and lever 55, which latter is pivoted at 56 and receives its motion from the cam 57 on the shaft 26. An in an out motion is transmitted to this needle-bar by the cam 58 through the lever 59 pivoted at 60 and the connector 61, and a sidewise motion is also imparted to this needle-bar in one direction by action of the end cam 94, see Fig. 1, driven from the cam-shaft 26 through the sprocket chain 95, the return motion being accomplished by spring 94ª.

Coöperating with this set of needles is a corresponding set of hooks 62 preferably of the latch hook type, each of which is constructed with a pivoted latch or finger 63 adapted to swing up and close the hook by the action of the loop when the needle is withdrawn therefrom. These hooks are arranged in rows and mounted in blocks 64 which are bolted or otherwise connected to a longitudinally-disposed bar 65 which extends the length of the machine and is located back of the facing-bar 43. The hooks being arranged to extend between the teeth of a comb 66 or set of corrugations formed on the lower edge of the facing-bar 43, see Fig. 3, whereby these hooks are guided laterally while acting upon the work.

This hook-bar 65 is pivotally supported at 69 by the arm 70 and the necessary in and out motion is imparted to this bar by the cam 73 through the lever 74 pivoted at 75 whose lower end is connected to this bar at 76.

The necessary tensioning motion is imparted to the chain thread 45 from the cam 77 through the arm 78, vertically disposed connecting rod 79 and tilting arm 80 at 81 which serves to move the tension-bar 49 in proper time to relieve and take up this thread while forming the loops.

In order to provide simple and effective means for engaging different sets of warp threads, which are shifted sidewise to predetermined positions by the action of the jacquard, and move them into operative relation with the hooks and needles, I have formed a row of fingers or points which are, like the hooks and needles, preferably mounted on different blocks 81 and connected to the longitudinally-disposed finger bar 82. An up and down motion is transmitted to this bar by the cam 83 through the lever 84 pivoted at 85, the outer end 86 of which lever is connected to this bar through the arm 87. The in and out motion is given to this finger bar by the cam 88 through the lever 89 pivoted at 90, the outer end 91 of which lever is connected through the bar 92 to this arm 87 at the point 93.

The following is a detail action of the combined movements of the hook and the needle in order to form the different loops in the chain thread.

Assuming the chain thread 45 to be hanging straight downward from the edge of the fabric on the right hand side of the hook 62 and passing through the eye of its needle 51 as illustrated in Fig. 17, which at this time is on a plane below the hook, as shown in said figure. The needle now moves to the left under the hook and then rises to a plane substantially level with the hook, then the hook moves backward engaging the thread which has been positioned therebeneath, drawing the bight thereof through the previously formed loop and into the position illustrated in Fig. 8. The needle next moves upward and then to the right side of the hook into the position illustrated in Fig. 10 where it remains until the hook comes forward carrying the latch portion through this loop just formed and ready to repeat the operation and form another loop in the chain in the manner above described.

In order to tie the warp or the independent threads into the chain loop, these warp and independent threads are selected by the jacquard and then raised by the fingers 80 as illustrated in Fig. 13 and hung onto the back of the hook as shown in Fig. 15, then the chain thread is looped around this thread in the manner just described locking the whole together.

The chain thread 45 which passes through the eye at the end of the needle, is formed into a series of loops by what is commonly known as the simple "chain stitch" illustrated in Fig. 18, the same being constructed by the combination of movements above described, of the hook and needle to tie the warp threads into the loops of the chain and to connect together the different chains to form a ground work, tissue or foundation and also form the desired design upon this ground work all of which results are obtained by the desired combination of movements of the different sets of wrap threads through the action of the thread-bars moved by the jacquard. These different sets of warp threads, after having been moved into the desired relative positions by the thread-bars, are engaged by a set of fingers or points 80 and raised into position to be engaged by the different hooks and finally tied or bound into the different chains so as to form any desired design of fabric. The combinations of movements of these warp and independent threads is, of course, practically unlimited whereby the different fabrics or characters of work are produced.

One of the essential features of my invention is, that by the use of these hooks, needles and fingers, threads of any desired size and character may be employed to be woven or connected into the fabric. Different sets of fingers may be provided having different spaces between them so as to receive different numbers or sizes of yarns. In this way it will be seen that the very heaviest kinds of lace work may be produced as well as the very finest.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. In a lace-making machine, the combination of a set of hooks, a set of needles, a set of jacquard operated thread bars, a set of fingers all operatively mounted, and means for operating each set independently and in time with each other to connect together a plurality of different sets of threads to form a fabric.

2. In a lace-making machine, the combination of a set of hooks, a set of needles, a set of jacquard operated thread bars, a set of fingers operated to raise the selected threads and hang them upon said hooks, and means for operating said mechanism to tie these threads together to form a fabric.

3. In a lace-making machine, the combination of a single set of hooks operatively mounted to the rear of the line of work, a single set of needles operatively mounted in front of the line of work, a set of jacquard operated thread bars, a single set of fingers operatively mounted in front of the line of work all mounted to coöperate one with the other to tie the different sets of threads together to form a fabric.

4. In a lace-making machine, the combination with a set of coöperating hooks and needles for operating upon one set of threads, jacquard mechanism for moving a second set of threads, and a set of fingers for engaging the jacquard moved threads and positioning them to be operated upon by said hooks and needles to be engaged by the first mentioned set of threads.

5. In a lace-making machine in combination a set of latch hooks, means for imparting an in and out motion to said hooks, a set of needles, means for imparting both an in and out and sidewise and an up and down movement to said needles, jacquard operated sidewise movable bars for positioning the warp thread, a set of fingers, and means for imparting both an in and out and an up and down motion to said fingers to coöperate with said hooks and needles.

6. In a lace-making machine in combination a set of latch hooks, means for imparting an in and out motion to said hooks in a longitudinal plane, a set of needles, means for imparting both an in and out and sidewise and an up and down movement to said needles, jacquard operated sidewise movable bars for positioning the warp thread, a set of fingers, and means for imparting both an in and an out motion to said fingers and raising them above the plane of said needles to coöperate with said hooks and needles.

In testimony whereof I affix my signature in presence of two witnesses.

EDGARD RENAULT.

Witnesses:
HOWARD E. BARLOW,
OLIVE CLARE.